(12) United States Patent
Ziemer et al.

(10) Patent No.: US 11,193,559 B2
(45) Date of Patent: Dec. 7, 2021

(54) AUTOMATIC TRANSMISSION

(71) Applicant: ZF Friedrichshafen AG, Friedrichshafen (DE)

(72) Inventors: Peter Ziemer, Tettnang (DE); Andreas Beisswenger, Friedrichshafen (DE); Christoph Margraf, Markdorf (DE); Stefan Brom, Canton, MI (US); Kai Bornträger, Langenargen (DE); Michael Trübenbach, Friedrichshafen (DE); Johannes Glückler, Eriskrich (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 339 days.

(21) Appl. No.: 16/462,280

(22) PCT Filed: Nov. 17, 2017

(86) PCT No.: PCT/EP2017/079551
§ 371 (c)(1),
(2) Date: May 20, 2019

(87) PCT Pub. No.: WO2018/108446
PCT Pub. Date: Jun. 21, 2018

(65) Prior Publication Data
US 2021/0277980 A1 Sep. 9, 2021

(30) Foreign Application Priority Data
Dec. 12, 2016 (DE) .......... 10 2016 224 739

(51) Int. Cl.
*F16H 3/66* (2006.01)
(52) U.S. Cl.
CPC ....... *F16H 3/66* (2013.01); *F16H 2200/0069* (2013.01); *F16H 2200/0086* (2013.01);
(Continued)

(58) Field of Classification Search
CPC .............. F16H 3/66; F16H 2200/0069; F16H 2200/0086; F16H 2200/2015; F16H 2200/2046
See application file for complete search history.

(56) References Cited

U.S. PATENT DOCUMENTS 7,699,741 B2 4/2010 Hart et al.
9,958,037 B1 * 5/2018 Kim .......................... F16H 3/66
(Continued)

FOREIGN PATENT DOCUMENTS

DE 10 2005 002 337 A1 8/2006
DE 10 2009 029 156 A1 3/2011
(Continued)

OTHER PUBLICATIONS

German Search Report Corresponding to 10 2016 224 739.5 dated May 10, 2017.
(Continued)

*Primary Examiner* — Carlos A Rivera
*Assistant Examiner* — Aimee Tran Nguyen
(74) *Attorney, Agent, or Firm* — Finch & Maloney, PLLC; Michael J. Bujold; Jay S. Franklin (57) ABSTRACT

A transmission having planetary gearsets (RS1, RS2, RS3, RS4, RS5). Elements (ST2, ST4) of gearsets (RS2, RS4) form input and output shafts, respectively. Element (SO1) of gearset (RS1) couples element (HO5) of gearset (RS5) and can be immobilized by shift element (A). Element (ST1) of gearset (RS1) couples element (HO4) of gearset (RS4). Element (HO1) of gearset (RS1) can be immobilized by shift element (B). Elements (SO4, ST2) of gearsets (RS4 RS2) can connect by shift element (C). Elements (HO2, SO3, SO5) of gearsets (RS2, RS3, RS5) couple and can couple element (SO4) of gearset (RS4) by shift element (E). An element of gearset (RS4) is connected to an element of
(Continued)

gearset (RS3), while another element of gearset (RS4) can be connected by shift element (D) to another element of gearset (RS3). Elements (SO2 ST5) of gearsets (RS2, RS5) are connected and can be immobilized by shift element (F).

17 Claims, 4 Drawing Sheets

(52) U.S. Cl.
CPC ............... *F16H 2200/2015* (2013.01); *F16H 2200/2046* (2013.01)

(56) References Cited

U.S. PATENT DOCUMENTS

| | | | | |
|---|---|---|---|---|
| 9,958,038 B1* | 5/2018 | Kim | ............... | F16H 3/66 |
| 9,982,757 B1* | 5/2018 | Kim | ............... | F16H 3/66 |
| 2010/0331137 A1 | 12/2010 | Kamm et al. | | |
| 2016/0169352 A1* | 6/2016 | Lee | ............... | F16H 3/666 |
| | | | | 475/275 |
| 2018/0328459 A1* | 11/2018 | Kim | ............... | F16H 57/0018 |
| 2018/0328464 A1* | 11/2018 | Kim | ............... | F16H 3/66 |
| 2018/0328469 A1* | 11/2018 | Kim | ............... | F16H 3/66 |
| 2019/0128387 A1* | 5/2019 | Kim | ............... | F16H 3/66 |
| 2019/0390738 A1* | 12/2019 | Kim | ............... | F16H 3/44 |

FOREIGN PATENT DOCUMENTS

| | | |
|---|---|---|
| DE | 10 2013 216 619 A1 | 2/2015 |
| DE | 10 2015 214 217 A1 | 2/2017 |
| WO | 2014/072344 A1 | 5/2014 |

OTHER PUBLICATIONS

International Search Report Corresponding to PCT/EP2017/079551 dated Feb. 21, 2018.
Written Opinion Corresponding to PCT/EP2017/079551 dated Feb. 21, 2018.

* cited by examiner

Fig. 2

| Gear | A | B | C | D | E | F | Gear ratio | Efficiency | Gear interval | |
|---|---|---|---|---|---|---|---|---|---|---|
| | | | | | | | | | | R1/R2 |
| R1 | o | o | | o | | | -7.41 | 0.951 | 2.80 | R1/1 |
| R2 | | o | | o | | o | -2.67 | 0.94 | -0.73 | R2/2 |
| N | | o | | | | o | - | - | -0.73 | |
| 1 | | o | o | | | o | 9.29 | 0.911 | 1.95 | |
| 2 | o | | | | o | | 4.76 | 0.944 | 1.51 | |
| 3 | | o | o | | o | | 3.16 | 0.980 | 1.48 | |
| 4 | | o | | | o | | 2.13 | 0.988 | 1.44 | |
| 5 | | o | o | | o | | 1.48 | 0.987 | 1.32 | |
| 6 | | o | o | o | | | 1.12 | 0.994 | 1.12 | 1.18 |
| 7 | o | | o | o | | | 1.00 | 1.0 | 1.05 | |
| 8 | o | | | o | o | | 0.95 | 0.998 | 1.17 | |
| 9 | | | | o | o | o | 0.81 | 0.995 | 1.13 | |
| 10 | | | | o | o | | 0.71 | 0.994 | Spread 8.7 | |
| | | | | | | | | | Spread 13.09 | |
| 2b | o | o | o | o | | | 3.90 | 0.985 | | |
| 8b | | o | o | o | | o | 0.92 | 0.997 | | |

AUTOMATIC TRANSMISSION

This application is a National Stage completion of PCT/EP2017/079551 filed Nov. 17, 2017, which claims priority from German patent application serial no. 10 2016 224 739.5 filed Dec. 12, 2016.

FIELD OF THE INVENTION

The present invention relates to an automatic transmission of planetary design, with a plurality of shifting elements for engaging several gear ratios between the drive input shaft and the drive output shaft of the automatic transmission.

BACKGROUND OF THE INVENTION

Automatically shiftable vehicle transmissions of planetary design have already been described many times in the prior art and are the object of continual further development and improvement. Thus, such transmissions should have a sufficient number of gears and gear ratios well suited for motor vehicles, with a large overall spread, favorable gear intervals and a starting gear ratio large enough for the application concerned. On the other hand, these transmissions should be characterized by as little structural complexity as possible, in particular requiring a small number of shifting elements. In addition, in a sequential shifting series so-termed group shifts are usually avoided, i.e. when shifting to the next-higher or next-lower gear, in each case only one previously closed shifting element is opened and one previously open shifting element is closed.

Figure 1:
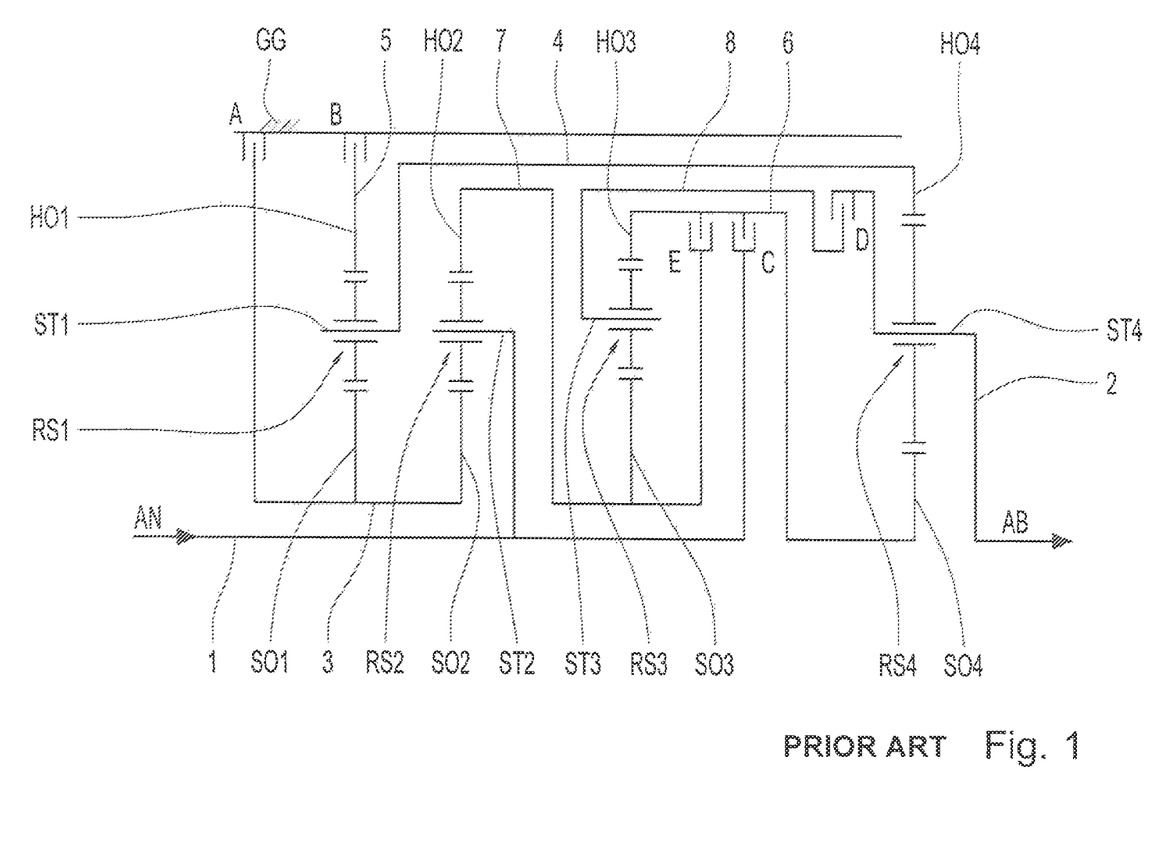
FIG. 1: A schematic representation of the automatic transmission of the type concerned, known from the prior art.

From DE 10 2005 002 337 A1 an automatic transmission is known, which comprises four individual simple gearsets and five shifting elements, with which by the selective closing in each case of three of these five shifting elements a total of eight forward gears can be engaged without group shifts and one reverse gear can also be engaged. FIG. 1 shows a schematic representation of this automatic transmission. In the figure the four planetary gearsets are indexed RS1, RS2, RS3, RS4 and are arranged in a transmission housing GG of the automatic transmission one after another in the sequence "RS1-RS2-RS3-RS4" as viewed in the axial direction. Each of these four planetary gearsets RS1, RS2, RS3, RS4 has a sun gear, a ring gear and a planetary carrier with planetary gearwheels mounted to rotate on the planetary carrier. The planetary gearwheels mesh with the sun gear and the ring gear. In FIG. 1 the five shifting elements are denoted by the letters A to E. In total the automatic transmission has eight rotating shafts, denoted in FIG. 1 by the numerals 1 to 8.

With regard to the coupling of the planetary gearset elements, the following provisions are made: The planetary carrier ST2 of the second planetary gearset RS2 forms the first rotating shaft 1, which is the transmission input shaft AN. The planetary carrier ST4 of the fourth planetary gearset RS4 forms the second rotating shaft 2, which is the transmission output shaft AB. The sun gear SO1 of the first planetary gearset RS1 and the sun gear SO2 of the second planetary gearset RS2 are permanently connected to one another and form the third rotating shaft 3. The planetary carrier ST1 of the first planetary gearset RS1 and the ring gear HO4 of the fourth planetary gearset RS4 are permanently connected to one another and form the fourth rotating shaft 4. The ring gear HO1 of the first planetary gearset RS1 is the fifth rotating shaft 5. The ring gear HO3 of the third planetary gearset RS3 and the sun gear SO4 of the fourth planetary gearset RS4 are permanently connected to one another and form the sixth rotating shaft 6. The ring gear HO2 of the second planetary gearset RS2 and the sun gear SO3 of the third planetary gearset RS3 are permanently connected to one another and form the seventh rotating shaft 7. The planetary carrier ST3 of the third planetary gearset RS3 is the eighth rotating shaft 8.

With regard to the arrangement of the shifting elements in the power flow of the transmission, the following provisions are made: The first shifting element A is in the form of a brake and is arranged in the power flow between the third rotating shaft 3 and the transmission housing GG. The second shifting element B is in the form of a brake and is arranged in the power flow between the fifth rotating shaft 5 and the transmission housing GG. The third shifting element C is a clutch and is arranged in the power flow between the first and sixth rotating shafts 1, 6. The fourth shifting element D is a clutch and is arranged in the power flow between the second and eighth rotating shafts 2, 8, so that the third planetary gearset RS3 can be brought into the power flow of the transmission by dosing the fourth shifting element D. The fifth shifting element E is a clutch and is arranged in the power flow between the sixth and seventh rotating shafts 6, 7 so that when the fifth shifting element E is closed, the sun gear SO3, the planetary carrier ST3 and the ring gear HO3 of the third planetary gearset RS3 rotate at the same rotational speed.

An automatic transmission very similar in its kinematics to this 8-gear automatic transmission is known from U.S. Pat. No. 7,699,741 B2. In that case the first planetary gearset is indexed "16", the second planetary gearset is indexed "18", the third planetary gearset is indexed "20" and the fourth planetary gearset is indexed "22", whereas the first shifting element is indexed "90", the second shifting element "92", the third shifting element "80", the fourth shifting element "84" and the fifth shifting element is indexed "82". The differences from DE 10 2005 002 337 A1 consist in the following: The eighth rotating shaft of the transmission is now formed by the ring gear "54" of the third planetary gearset "20" so that the shifting element "84", by means of which the third planetary gearset "20" can be brought into the power flow of the transmission, is now arranged in the power flow between the ring gear "54" of the third planetary gearset "20" and the sun gear "72" of the fourth planetary gearset "22", whereas the planetary carrier "56" of the third planetary gearset "20" is permanently connected to the planetary carrier "76" of the fourth planetary gearset "22" and the transmission output shaft "14". The sixth rotating shaft of the transmission is now formed by the sun gear "72" of the fourth planetary gearset "22" alone, so that the fifth shifting element "82", which is arranged in the power flow between the sun gear "72" of the fourth planetary gearset "22" and the sun gear "52" of the third planetary gearset "20", no longer results automatically in its closed condition to blocking of the third planetary gearset "20". To block the third planetary gearset "20", the fourth and fifth shifting elements "84", "82" must now be closed at the same time.

SUMMARY OF THE INVENTION

The purpose of the present invention is to further develop these automatic transmissions known from the prior art, in particular in relation to the possibility of modular use with a large number of gears that can be adapted to the application concerned.

According to the invention, this objective is achieved by an automatic transmission having the characteristics specified in the independent claim(s). Additional advantageous design features and further developments emerge from the subordinate claims.

According to these, the invention starts from an automatic transmission comprising a transmission housing, a rotating transmission input shaft, a rotating transmission output shaft, a first, second, third and fourth planetary gearset each having three elements, and a first, second, third, fourth and fifth shifting element for engaging various gear ratios between the transmission input shaft and the transmission output shaft. In this case the second element of the second planetary gearset forms the transmission input shaft, while the second element of the fourth planetary gearset forms the transmission output shaft. The first element of the first planetary gearset can be immobilized relative to the transmission housing by means of the first shifting element. The second element of the first planetary gearset and the third element of the fourth planetary gearset are permanently connected to one another. The third element of the first planetary gearset can be immobilized relative to the transmission housing by means of the second shifting element. The first element of the fourth planetary gearset can be connected by means of the third shifting element to the second element of the second planetary gearset. The third element of the second planetary gearset and the first element of the third planetary gearset are permanently connected to one another and can be connected to the first element of the fourth planetary gearset by means of the fifth shifting element.

To ensure that the third planetary gearset can be brought into the power flow of the automatic transmission by closing the fourth shifting element, an element of the fourth planetary gearset is permanently connected to an element of the third planetary gearset, while another element of the fourth planetary gearset can be connected to another element of the third planetary gearset by means of the fourth shifting element.

According to the invention, the automatic transmission additionally comprises a fifth planetary gearset with three elements and in addition a sixth shifting element. In this case the first element of the fifth planetary gearset is permanently connected to the third element of the second planetary gearset, while the third element of the fifth planetary gearset is connected permanently to the first element of the first planetary gearset (RS1). Besides, in this case the second element of the fifth planetary gearset is permanently connected to the first element of the second planetary gearset and can be immobilized relative to the transmission housing by means of the sixth shifting element.

The expression "element of a planetary gearset" is understood to mean a sun gear, a planetary carrier or a ring gear of the planetary gearset.

In connection with the coupling of a shifting element to a planetary gearset, the expression "permanently connected" is understood to mean that the input or output element of the shifting element concerned is connected directly to one of the elements of the planetary gearset concerned by way of a rotationally fixed or rotationally elastic connection, so that there is at all times a fixed rotational speed relationship between the planetary gearset element and the input or output element of the shifting element.

In connection with the coupling of a shifting element to a shaft, the expression "permanently connected" is understood to mean that the input or output element of the shifting element concerned is connected directly to the shaft concerned by way of a rotationally fixed or rotationally elastic connection, so that there is at all times a fixed rotational speed relationship between the shaft and the input or output element of the shifting element.

In connection with the coupling of a planetary gearset to another planetary gearset, the expression "permanently connected" is understood to mean that one of the elements of the planetary gearset concerned is connected directly to one of the elements of the other planetary gearset concerned by way of a rotationally fixed or rotationally elastic connection, so that there is at all times a fixed rotational speed relationship between the two planetary gearsets. That permanent connection includes a one-piece design and likewise a structure in the form of a common component such as a planetary carrier-to-planetary carrier coupling or a ring gear-to-ring gear coupling in which the two ring gears have the same tooth geometry.

In connection with the coupling of a planetary gearset element or a shifting element to the housing, the expression "permanently connected" is understood to mean that the planetary gearset element or the output element of the shifting element concerned is connected directly to the housing by way of a rotationally fixed or rotationally elastic connection, so that the planetary gearset element or the output element of the shifting element concerned is always immobilized.

In a first preferred design of the invention, the first element of the fourth planetary gearset is permanently connected to the third element of the third planetary gearset, whereas the second element of the fourth planetary gearset can be connected by means of the fourth shifting element to the second element of the third planetary gearset.

In a second preferred design of the invention the second element of the fourth planetary gearset is permanently connected to the second element of the third planetary gearset, whereas the first element of the fourth planetary gearset can be connected by means of the fourth shifting element to the third element of the third planetary gearset.

Each of the planetary gearsets can be designed as a "plus" planetary gearset or as a "minus" planetary gearset. Each planetary gearset comprises a first element in the form of a sun gear. Each planetary gearset designed as a minus planetary gearset has a second element in the form of a planetary carrier and a third element in the form of a ring gear, whereas each planetary gearset designed as a plus planetary gearset has a second element in the form of a ring gear and a third element in the form of a planetary carrier. As is known, a minus planetary gearset has a planetary carrier with planetary gearwheels mounted to rotate on it, which all mesh with the sun gear and with the ring gear of the planetary gearset. In contrast, a plus planetary gearset has a planetary carrier with inner and outer planetary gearwheels mounted to rotate on it, wherein each of the inner planetary gearwheels meshes with a respective outer planetary gearwheel and with the sun gear of the plurality planetary gearset, while each of the outer planetary gearwheels meshes with a respective inner planetary gearwheel and with the ring gear of the plus planetary gearset.

Thus, the automatic transmission according to the invention, which is particularly suitable for use in the drive-train of a motor vehicle, has a distinct kinematic of its own compared with the relevant prior art, wherein by using the now six shifting elements up to ten forward gears with gear ratios that are useful in practice and with gear intervals likewise appropriate for practice can be engaged. In addition up to two reverse gears can be engaged.

Preferably, with the automatic transmission according to the invention, in each gear three of the six shifting elements are closed and when shifting from a gear to the next-higher or next-lower gear, in each case only one of the previously closed shifting elements is opened and one of the previously open shifting element is closed, so that in sequential upshifts and downshifts by one gear at a time, so-termed group shifts are avoided.

In order to obtain ten forward gears and two reverse gears with the ten shifting elements, the following shifting logic or gear logic can be applied:

In the first forward gear the second, third and sixth shifting elements are torque-transmitting. In the second forward gear preferably the second, fifth and sixth shifting elements are torque-transmitting, or alternatively the first, second and third shifting elements. In the third forward gear the first, second and fifth shifting elements are torque-transmitting. In the fourth forward gear the second, third and fifth shifting elements are torque-transmitting. In the fifth forward gear the second, fourth and fifth shifting elements are torque-transmitting. In the sixth forward gear the second, third and fourth shifting elements are torque-transmitting. In the seventh forward gear the third, fourth and fifth shifting elements are torque-transmitting. In the eighth forward gear, preferably the first, third and fourth shifting elements are torque-transmitting, or alternatively the third, fourth and sixth shifting elements. In the ninth forward gear the first, fourth and fifth shifting elements are torque-transmitting. In the tenth forward gear the fourth, fifth and sixth shifting elements are torque-transmitting. In the first reverse gear the first, second and fourth shifting elements are torque-transmitting, whereas in the second reverse gear the second, fourth and sixth shifting elements are torque-transmitting.

This example shifting logic enables as large a number of gears as possible with as large a spread as possible to be obtained, which offers good prerequisites in particular for a modular transmission system with variants having different gear numbers. In an advantageous manner it is possible to design the first forward gear as a forward crawler gear with a very high starting gear ratio and the first reverse gear as a reverse crawler gear with a very high starting gear ratio, and to allow these two crawler gears only in certain vehicle types—such as utility vehicles, pick-ups or cross-country vehicles—by control means. Alternatively, it is also possible for these crawler gears to be actuated in the transmission only depending on the situation, for example in combination with a special driver's command in a cross-country vehicle.

Thus, from the shifting logic proposed for a 10-gear automatic transmission a variant attractive from the standpoints of spread and gear intervals is obtained if the original first forward gear is separated as a forward crawler gear, or eliminated, and if the original first reverse gear is separated as a reverse crawler gear, or eliminated. A shifting logic modified in that way produces an automatic transmission with nine forward gears that can be engaged without group shifts and one reverse gear, with the option of an additional forward crawler gear and the option of an additional reverse crawler gear.

A further option on the basis of the shifting logic proposed for a 10-gear automatic transmission is to omit the original seventh forward gear, so that a shifting logic modified in that way produces an automatic transmission with at least eight forward gear that can be engaged without group shifts and at least one reverse gear, without adverse effect on the spread when the options for the additional forward crawler gear and the additional reverse crawler gear are maintained. The omission of the direct gear of the 10-gear automatic transmission proposed here will have hardly any effects in practice, granted the still very fine gradation.

Consideration of the diverse shifting options makes it evident that the automatic transmission according to the invention particularly advantageously enables its modular use in motor vehicles with various gear numbers, without having to modify the design of the automatic transmission for this.

Provided that the kinematics, according to the invention, of coupling the five planetary gearsets with one another, to the various shifting elements, to the drive input shaft and to the drive output shaft are maintained, the design structure of the automatic transmission can be varied within wide limits. Preferably, to the benefit of efficiency all the planetary gearsets are designed as minus planetary gearsets whose planetary gearwheels mesh with the sun gear and also with the ring gear in each case. As already mentioned earlier, however, individual or even more than one of the planetary gearsets can be made as plus planetary gearsets, which makes possible alternative spatial arrangements of individual shifting elements within the transmission housing.

With regard to the spatial arrangement of the five planetary gearsets in the housing of the automatic transmission, in one embodiment it is proposed to arrange the five planetary gearsets coaxially with one another and one behind another in the axial direction, in the defined sequence "first, fifth, second, third, fourth" planetary gearset. In a simple manner all the shifting elements can be supplied, with low leakage, with the pressure medium required for their hydraulic actuation. For an application in which the drive input and the drive output of the automatic transmission are arranged coaxially with one another, it is expedient for the first planetary gearset to be the planetary gearset of the group of planetary gearsets that faces toward the drive input.

Obviously, other spatial arrangements of the five planetary gearsets in the housing of the automatic transmission are also possible, which also enable alternative possible arrangements of the shifting elements. Thus, in another design it is proposed to arrange the five planetary gearsets coaxially with one another and one after the other in the axial direction, in the defined sequence "first, fifth, third, second, fourth" planetary gearsets.

Provided that the kinematics, according to the invention, of coupling the five planetary gearsets with one another, to the various shifting elements, to the drive input shaft and to the drive output shaft are maintained, the spatial arrangement of the shifting elements within the transmission housing can also he varied within wide limits.

In a preferred spatial arrangement of the shifting elements the first shifting element in the form of a brake and the additional, sixth shifting element also in the form of a brake are arranged on the side of the first planetary gearset remote from the fifth planetary gearset. As viewed in the axial direction, the second shifting element, in the form of a brake, is preferably arranged in an area radially above the first planetary gearset. The third shifting element, the fourth shifting element and the fifth shifting element, all of them in the form of clutches, as viewed in the axial direction, are preferably arranged axially next to one another between the third and fourth planetary gearsets, while the fifth shifting element is arranged adjacent to the third planetary gearset and the fourth shifting element is arranged adjacent to the fourth planetary gearset, so that the third shifting element is arranged between the fourth shifting element and the fifth shifting element.

All the proposed embodiments and designs of an automatic transmission according to the invention, particularly for passenger cars and light utility vehicles, have gear ratios that are usable in practice, with a very large total spread and gear intervals favorable with regard to drivability, which has a positive effect in relation to the low fuel consumption desired. Furthermore, the automatic transmission according to the invention is characterized by good efficiency.

Advantageously, with the automatic transmission according to the invention the motor vehicle can be started both with a starting element external to the transmission and also with a transmission-internal frictional shifting element. As is known, a transmission-external starting element can he for example a hydrodynamic torque converter (preferably with a converter bridging clutch), a so-termed dry starting clutch, a so-termed wet starting clutch, a magnetic powder clutch or a centrifugal force clutch. Alternatively to the arrangement of such a starting element in the power flow direction between the drive engine and the automatic transmission, the transmission-external starting element can also be arranged in the power flow direction behind the automatic transmission, and in that case the drive input shaft of the automatic transmission is permanently connected in a rotationally fixed or rotationally elastic manner to the crankshaft of the drive engine. As the transmission-internal starting element, particularly suitable is the second shifting element in the form of a brake, which in the transmission embodiment as a 10-gear automatic transmission described is torque-transmitting in the first six forward gears and in the two reverse gears.

Furthermore, the automatic transmission according to the invention is so designed as to enable it to be adapted to various drive-train designs, both in the power flow direction and also from the spatial standpoint. Thus, with the same transmission layout, depending on the stationary transmission gear ratio of the individual planetary gearsets, different gear intervals can be obtained, so enabling application-specific or vehicle-specific variations. Moreover, it is possible without particular design complexity to arrange the drive input and the drive output of the automatic transmission optionally coaxially or axis-parallel with one another. An axle differential and/or a distribution differential can be arranged on the drive input side or on the drive output side of the automatic transmission. It is also possible at any suitable point in the automatic transmission to provide additional freewheels, for example between a shaft and the housing or, if necessary, to connect two shafts. Furthermore, on any shaft, preferably the drive input shaft or the drive output shaft, a wear-free brake such as a hydraulic or electric retarder can be arranged, this being of particular significance for use in utility vehicles. An auxiliary power takeoff for driving additional aggregates can also be provided on any shaft, preferably on the drive input shaft or on the drive output shaft.

A further advantage of the automatic transmission according to the invention is that it is well-suited for use in a hybrid drive-train. Thus, in principle an electric machine can be connected to any of its rotating shafts as a generator or an additional drive machine. Preferably such an electric machine is coupled directly to the transmission input shaft or directly to the transmission output shaft. However, the gearset concept proposed also enables such an electric machine, in a simply designed manner, to be coupled directly to the ninth rotating shaft or even directly to the third rotating shaft, so that the electric machine can then exert a supporting torque even as part of individual gearshift changes.

The shifting elements used can be in the form of power-shift clutches or brakes. In particular, frictional clutches or brakes such as disk clutches, band brakes and/or conical clutches can be used. However, interlocking brakes and/or clutches, such as synchronizers or claw clutches, can also be used as shifting elements.

BRIEF DESCRIPTION OF THE DRAWINGS

Below, examples of the invention are explained in greater detail with reference to the drawings, in which the same or comparable components are given the same indexes and which show.

DETAILED DESCRIPTION OF THE PREFERRED EMBODIMENTS

The gearset layout represented in FIG. 1, of the automatic transmission of the type concerned, known from the prior art, has already been explained in detail in the context of the introductory part of the description.

Figure 2:
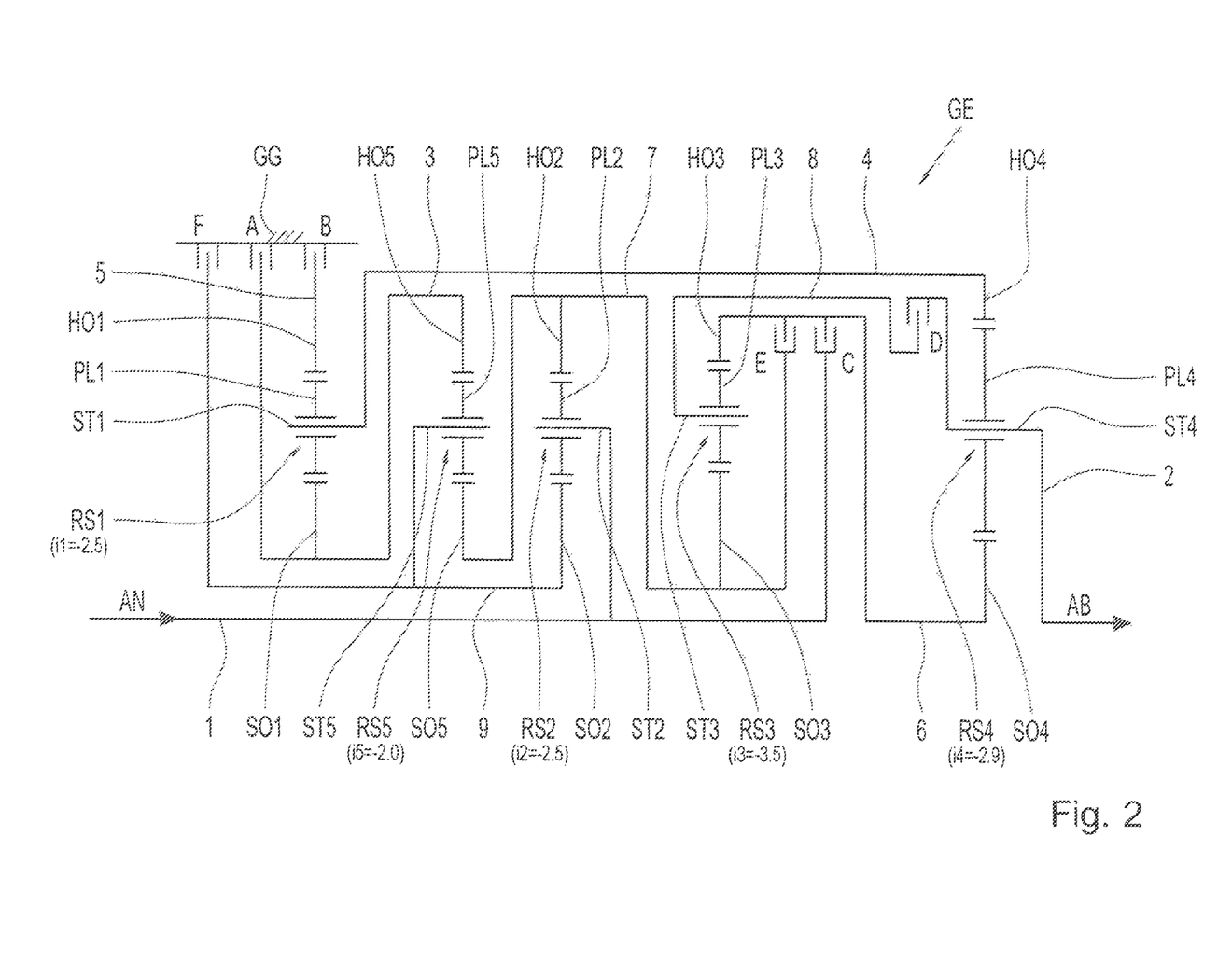
FIG. 2: A schematic representation of a first example embodiment of an automatic transmission according to the invention.

FIG. 2 shows a gearset layout of a first example embodiment of an automatic transmission according to the invention. The transmission GE in the form of an automatic transmission comprises a transmission input shaft AN, a transmission output shaft AB, five planetary gearsets RS1, RS2, RS3, RS4 and RS5, and six shifting elements A, B, C, D, E and F, all of them accommodated in a transmission housing GG of the transmission GE. Considered spatially, the five planetary gearsets RS1, RS2, RS3, RS4 and RS5 are, for example, arranged coaxially with one another and axially one after the other, in this case for example in the sequence "RS1-RS5-RS2-RS3-RS4", such that the first planetary gearset RS1 is facing toward a drive input of the transmission GE. In all, the transmission has nine rotating shafts denoted in FIG. 2 by the numerals 1 to 9, wherein the first rotating shaft 1 serves as the transmission input shaft AN while the second rotating shaft 2 serves as the transmission output shaft AB.

The transmission GE can be driven, for example, by an internal combustion engine whose rotating crankshaft, for example, is functionally connected to the transmission input shaft AN of the transmission GE by means of a starting element in the form of a torque converter. For simplicity, the drive input of the transmission GE is not shown in greater detail in FIG. 2. Depending on the application concerned, a person with knowledge of the field will also be able to provide some other starting element, such as a starting clutch.

Each of the five planetary gearsets RS1, RS2, RS3, RS4 and RS5 is designed as a so-termed minus planetary gearset comprising three elements, to the benefit of efficiency. The first planetary gearset RS1 comprises as its first element a sun gear SO1, as its second element a planetary carrier ST1 and as its third element a ring gear HO1. In accordance with the structure of the first planetary gearset RS1 as a minus planetary gearset, on the planetary carrier ST1 planetary gearwheels PL1 are mounted to rotate, which all mesh both with the sun gear SO1 and with the ring gear HO1. The second planetary gearset RS2 comprises as its first element a sun gear SO2, as its second element a planetary carrier ST1 and as its third element a ring gear HO2. In accordance with the structure of the second planetary gearset RS2 as a minus planetary gearset, on the planetary carrier ST2 planetary gearwheels PL2 are mounted to rotate, which all mesh with the sun gear SO2 and the ring gear HO2. The third planetary gearset RS3 comprises as its first element a sun gear SO3, as its second element a planetary carrier ST3 and as its third element a ring gear HO3. In accordance with the structure of the third planetary gearset RS3 as a minus planetary gearset, on the planetary carrier ST3 planetary gearwheels PL3 are mounted to rotate, which all mesh with the sun gear SO3 and with the ring gear HO3. The fourth planetary gearset RS4 comprises as its first element a sun gear SO4, as its second element a planetary carrier ST4 and as its third element a ring gear HO4. In accordance with the structure of the fourth planetary gearset RS4 as a minus planetary gearset, on the planetary carrier ST4 planetary gearwheels PL4 are mounted to rotate, which all mesh with the sun gear SO4 and with the ring gear HO4. The fifth planetary gearset RS5 comprises as its first element a sun gear SO5, as its second element a planetary carrier ST5 and as its third element a ring gear HO5. In accordance with the structure of the fifth planetary gearset RS5 as a minus planetary gearset, on the planetary carrier ST5 planetary gearwheels PL5 are mounted to rotate, which all mesh with the sun gear SO5 and with the ring gear HO5.

With regard to the coupling of the planetary gearset elements, in this case the following provisions are made: The planetary carrier ST2 of the second planetary gearset RS2 forms the first rotating shaft 1 of the transmission GE and therefore the transmission input shaft AN. The planetary carrier ST4 of the fourth planetary gearset RS4 forms the second rotating shaft 2 of the transmission GE and therefore the transmission output shaft AB. The sun gear SO1 of the first planetary gearset RS1 and the ring gear HO5 of the fifth planetary gearset RS5 are permanently connected to one another, and together form the third rotating shaft 3 of the transmission GE. The planetary carrier ST1 of the first planetary gearset RS1 and the ring gear HO4 of the fourth planetary gearset RS4 are permanently connected to one another and together form the fourth rotating shaft 4 of the transmission GE. The ring gear HO1 of the first planetary gearset RS1 forms the fifth rotating shaft 5 of the transmission GE. The ring gear HO3 of the third planetary gearset RS3 and the sun gear SO4 of the fourth planetary gearset RS4 are permanently connected to one another and together form the sixth rotating shaft 6 of the transmission GE. The sun gear SO5 of the fifth planetary gearset RS5, the ring gear HO2 of the second planetary gearset RS2 and the sun gear SO3 of the third planetary gearset RS3 are permanently connected to one another and together form the seventh rotating shaft 7 of the transmission GE. The planetary carrier ST3 of the third planetary gearset RS3 forms the eighth rotating shaft 8 of the transmission GE. The planetary carrier ST5 of the fifth planetary gearset RS5 and the sun gear SO2 of the second planetary gearset RS2 are permanently connected to one another and together form the ninth rotating shaft 9 of the transmission GE.

With regard to the arrangement of the shifting elements in the power flow of the transmission GE, in this case the following provisions are made: The first shifting element A is in the form of a brake and is arranged in the power flow between the third rotating shaft 3 and the transmission housing GG, so that when the first shifting element A is closed, the sun gear SO1 of the first planetary gearset RS1 and the ring gear HO5 of the fifth planetary gearset RS5 together are immobilized relative to the transmission housing GG. The second shifting element B is in the form of a brake and is arranged in the power flow between the fifth rotating shaft 5 and the transmission housing GG, so that when the second shifting element B is closed, the ring gear HO1 of the first planetary gearset RS1 is immobilized relative to the transmission housing GG. The third shifting element C is in the form of a clutch and is arranged in the power flow between the first and sixth rotating shafts 1, 6, so that when the third shifting element C is closed, the ring gear HO3 of the third planetary gearset RS3 and the sun gear SO4 of the fourth planetary gearset RS4 together are connected to the planetary carrier ST2 of the second planetary gearset RS2, i.e. to the transmission input shaft AN. The fourth shifting element D is in the form of a clutch and is arranged in the power flow between the second and eighth rotating shafts 2, 8, so that when the fourth shifting element D is closed, the planetary carrier ST3 of the third planetary gearset RS3 is connected to the planetary carrier ST4 of the fourth planetary gearset RS4, i.e. to the transmission output shaft AB. The fifth shifting element E is in the form of a clutch and is arranged in the power flow between the sixth and seventh rotating shafts 6, 7, so that when the fifth shifting element E is closed, the third planetary gearset RS3 is blocked, a condition in which the sun gear SO3, the planetary carrier ST3 and the ring gear HO3 rotate at the same rotational speed. The sixth shifting element F is in the form of a brake and is arranged in the power flow between the ninth rotating shaft 9 and the transmission housing GG, so that when the sixth shifting element F is closed, the sun gear SO2 of the second planetary gearset RS2 and the planetary carrier ST5 of the fifth planetary gearset RS5 together are immobilized relative to the transmission housing GG.

The transmission GE can be shifted by virtue of its six shifting elements A, B, C, D, E and F, which in FIG. 2, are for example all made as frictional shifting elements with disks as their frictional components. Below, their spatial arrangement in the transmission housing GG will be described in more detail.

The spatial arrangement of the five planetary gearsets RS1, RS2, RS3, RS4, RS5 in a row one after another in the sequence. "RS1-RS5-RS2-RS3-RS4", in combination with the gearset kinematics according to the invention, make it possible to design and construct a very compact gearset assembly comprising the first, fifth and second planetary gearsets RS1, RS5, RS2 on one side of the connection which joins the planetary carrier ST2 of the second planetary gearset RS2 to the transmission input shaft AN, with the fifth planetary gearset RS5 forming the central planetary gearset of this gearset assembly, with one side axially immediately adjacent to the first planetary gearset RS1 and its other side immediately adjacent to the second planetary gearset RS2. On the other side of the connection which joins the planetary carrier ST2 of the second planetary gearset RS2 to the transmission input shaft AN, in this case the third planetary gearset RS3 is next in line.

The brake B, whose inner disk carrier is permanently connected to the ring gear HO1 of the first planetary gearset RS1, is in FIG. 2, as viewed in the axial direction with its frictional element in the form of a disk pack, arranged radially above the first planetary gearset RS1 on a large diameter in the area of the cylindrical inside wall of the transmission housing GG. In a known manner the outer disk carrier of the brake B can be integrated in the transmission housing GG. In a manner advantageous from the production technical standpoint, the inner disk carrier of the brake B and the ring gear HO1 of the first planetary gearset RS1 can be made as a common—preferably one-piece—component. Also advantageous is the very simple-to-design accessibility for the hydraulic (or alternatively mechanical or alternatively electrical) control of the brake B from outside the transmission housing GG. Correspondingly, the servo-device provided for actuating the disk pack of the brake B can be arranged on or in the transmission housing GG to the left or to the right of the disk pack of the brake B.

The brake A, whose inner disk carrier is permanently connected to the sun gear HO1 of the first planetary gearset RS1 (and to the ring gear HO5 of the fifth planetary gearset RS5) is, as viewed axially in FIG. 2, arranged with its frictional element in the form of a disk pack on the side of the first planetary gearset R1 that faces away from the fifth planetary gearset RS5, and on a large diameter in the area of the cylindrical inside wall of the transmission housing GG. In a known manner the outer disk carrier of the brake A can be integrated in the transmission housing GG. The disk pack of the brake A is thus arranged close to the disk pack of the brake B, preferably on the same diameter, in order to enable the use of identical parts. Also advantageous is the very simple-to-design accessibility for the hydraulic (or alternatively mechanical or alternatively electrical) control of the brake A from outside the transmission housing GG. Correspondingly, the servo-device provided for actuating the disk pack of the brake A can be arranged on or in the transmission housing GG to the left or to the right of the disk pack of the brake A.

The brake F, whose inner disk carrier is permanently connected to the planetary carrier ST5 of the fifth planetary gearset RS5 (and to the sun gear SO2 of the second planetary gearset RS2), is in FIG. 2, as viewed in the axial direction, arranged with its frictional element in the form of a disk pack on the side of the brake A that faces away from the first planetary gearset RS1 and on a large diameter in the area of the cylindrical inside wall of the transmission housing GG. In a known manner, the outer disk carrier of the brake F can be integrated in the transmission housing GG. Thus, the disk pack of the brake F is arranged adjacent to the disk pack of the brake A, preferably on the same diameter, in order to enable the use of identical components. Also advantageous is the very simple-to-design accessibility for the hydraulic (or alternatively mechanical or alternatively electrical) control of the brake F from outside the transmission housing GG, Correspondingly, the servo-device provided for actuating the disk pack of the brake F can be arranged on or in the transmission housing GG to the left or to the right of the disk pack of the brake F.

Alternatively to the example embodiment shown in FIG. 2, it can also be provided that as viewed in the axial direction the brakes A and F are arranged in one plane, i.e. radially one above the other, and in that case the brake F is positioned radially under the brake A. Then the servo-device provided for actuating the brakes A and F can in a simple-to-design manner be arranged in a cover of the housing, which is connected firmly to the transmission housing GG (and which closes the transmission housing GG in the direction toward the drive input).

The three clutches E, C and D in FIG. 2 are arranged axially between the third and the fourth planetary gearsets RS3, RS4. The fourth planetary gearset RS4 delimits the transmission GE in the drive input direction.

The clutches E and C form a clutch assembly with a common outer disk carrier, which is permanently connected to the ring gear HO3 of the third planetary gearset RS3 and to the sun gear of the fourth planetary gearset RS4. Correspondingly, the inner disk carrier of the clutch E is permanently connected to the sun gear SO3 of the third planetary gearset RS3 (and to the ring gear HO2 of the second planetary gearset RS2 and the sun gear SO5 of the fifth planetary gearset RS5), whereas the inner disk carrier of the clutch C is permanently connected to the transmission input shaft AN (and to the planetary carrier ST2 of the second planetary gearset RS2). As viewed in the axial direction this clutch assembly is arranged immediately next to the third planetary gearset RS3, with the clutch E closer to the third planetary gearset RS3 than is the clutch C. Expediently, the inner disk carrier of the clutch C holds both the disk pack of the clutch C and also the servo-device required for actuating the disk pack, which enables a simply designed and low-leakage supply of pressure and lubricating medium for the hydraulic control and cooling of the rotating clutch C by way of the transmission input shaft AN. Expediently, the inner disk carrier of the clutch E holds both the disk pack of the clutch E and also the servo-device required for actuating the disk pack, so that pressure and lubricating medium for the hydraulic control and cooling of the rotating clutch E can be supplied by way of the transmission input shaft AN via the hub of the inner disk carrier of the clutch E mounted to rotate on the transmission input shaft AN.

The clutch D is arranged directly next to the fourth planetary gearset RS4, on the side of the fourth planetary gearset RS4 facing toward the third planetary gearset RS3. The inner disk carrier of the clutch D is permanently connected to the planetary carrier ST3 of the third planetary gearset RS3. Correspondingly, the outer disk carrier of the clutch D is permanently connected to the planetary carrier ST4 of the fourth planetary gearset RS4. Expediently, the outer disk carrier of the clutch and the planetary carrier ST4 can in this case be made as a single component. Expediently, the outer disk carrier of the clutch D holds both the disk pack of the clutch D and also the servo-device required for actuating this disk pack, which enables a simply designed and low-leakage supply of pressure and lubrication medium for the hydraulic control and cooling of the rotating clutch D by way of the transmission output shaft AB.

While maintaining the given transmission kinematic, the spatial arrangement of the six shifting elements A, B, C, D, E, F inside the transmission housing GG can be varied within wide limits and is restricted only by the dimensions and the external shape of the transmission housing GG. Correspondingly, the component arrangement shown in FIG. 2 is expressly to be understood as only one example among many possible component arrangement variants. In the same way, the structure of the shifting elements shown in FIG. 2, namely as disk clutches or disk brakes, is to be understood as only an example. In alternative embodiments, for example, claw or conical clutches that engage with interlock, frictional band brakes or even claw or conical brakes that are applied with interlock could also be used.

Figure 3:
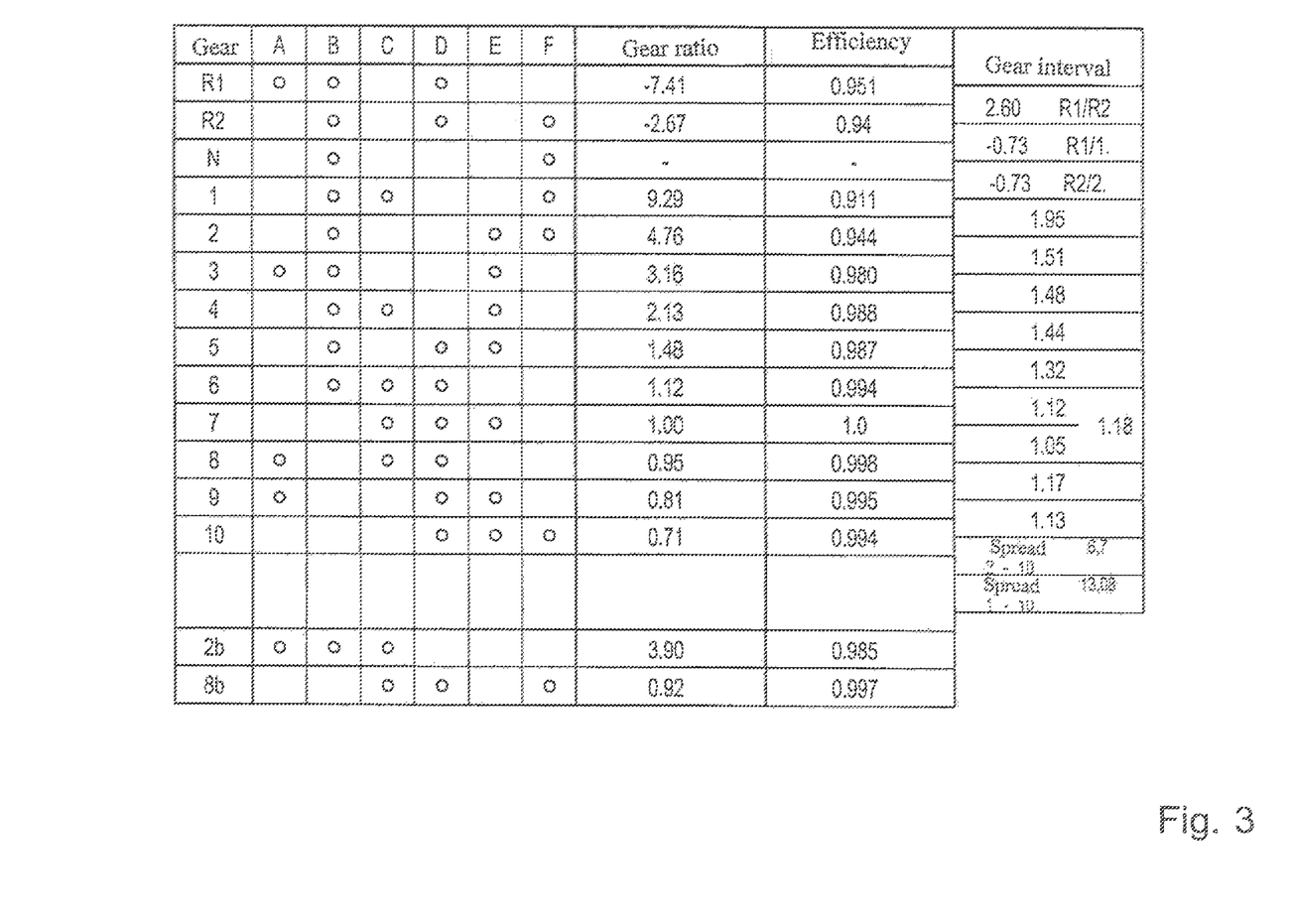
FIG. 3: An example of a shifting scheme for the automatic transmission shown in FIG. 2.

As already mentioned earlier, with the transmission GE of FIG. 2 with its total of six shifting elements A, B, C, D, E, F a selective engagement of up to ten forward gears and two reverse gears can be obtained, as will be explained in greater detail with reference to FIG. 3. Thus, FIG. 3 shows an example of a shifting scheme for the automatic transmission according to FIG. 2. In each gear three shifting elements are closed, as indicated in the columns of FIG. 3 associated with the individual shifting elements A, B, C, D, E, F by the insertion of an "o".

Accordingly, to obtain ten forward gears and two reverse gears with the six shifting elements A, B, C, D, E, F, the following shifting logic or gear logic is proposed: In the first forward gear "1" the second shifting element B, the third shifting element C and the sixth shifting element F are torque-transmitting (i.e. closed). In the second forward gear "2" the second shifting element B, the fifth shifting element E and the sixth shifting element F are closed. In the third forward gear "3" the first shifting element A, the second shifting element B and the fifth shifting element E are closed. In the fourth forward gear "4" the second shifting element B, the third shifting element C and the fifth shifting element E are closed. In the fifth forward gear "5" the second shifting element B, the fourth shifting element D and the fifth shifting element E are closed. In the sixth forward gear "6" the second shifting element B, the third shifting element C and the fourth shifting element D are closed. In the seventh forward gear "7" the third shifting element C, the fourth shifting element D and the fifth shifting element E are closed. In the eighth forward gear "8" the first shifting element A, the third shifting element C and the fourth shifting element D are closed. In the ninth forward gear "9" the first shifting element A, the fourth shifting element B and the fifth shifting element E are closed. In the tenth forward gear "10" the fourth shifting element D, the fifth shifting element E and the sixth shifting element F are closed. In the first reverse gear "R1" the first shifting element A, the second shifting element B and the fourth shifting element D are closed, and in the second reverse gear "R2" the second shifting element B, the fourth shifting element D and the sixth shifting element F are closed.

In FIG. 3 an alternative shifting element combination "2b" for forming the second forward gear is indicated, in which the first, second and third shifting elements A, B, C are torque-transmitting. Also indicated in FIG. 3 is a shifting element combination "8b" for obtaining the eighth forward gear, in which the third, fourth and sixth shifting elements are closed.

In accordance with the shifting logic indicated in FIG. 3, in sequential shifts—i.e. upshifts or downshifts by one gear at a time—so-termed group shifts are avoided, since two adjacent gears in the shift scheme always use two shifting elements together.

In FIG. 3, besides the shifting logic reasonable possible gear ratios of the individual gears and their computed efficiencies are also indicated, as well as the gear intervals and spread that result from these gear ratios in each case. It is therefore easy to see that the first forward gear "1" and the first reverse gear "R1" have a very high nominal gear ratio, so that the first forward gear "1" and the first reverse gear "R1" are suitable as so-termed crawling gears which only need to be engaged in the transmission under particular conditions, whereas normal starting can take place in the second forward gear "2" or the second reverse gear "R2" respectively.

Correspondingly, the shifting logic shown in FIG. 3 also proposes that in the neutral position "N" the second and sixth shifting elements B, F are preferably closed, so that for normal starting only one further shifting element has to be closed, namely for starting in the second forward gear "2" the fifth shifting element E and for starting in the second reverse gear "R2" the fourth shifting element D. Also, to start in the crawling gear "1" only one further shifting element has to be closed, namely the third shifting element C. On the other hand, to start in the crawling gear "R1" the previously closed sixth shifting element F has to be opened, before the first and fourth shifting elements are closed. Of course, as an alternative it can also be proposed that in the neutral position only one shifting element—and in that case preferably the second shifting element B—is closed, or even none at all.

From the gear intervals indicated in FIG. 3 it is also easy to see that if needs be, the seventh forward gear "7" designed as a direct gear can be omitted without the driver of the motor vehicle perceiving this as disturbing during normal driving operation.

Of course, the transmission layout shown in FIG. 2 can also be obtained with a different spatial arrangement of the five planetary gearsets RS1, RS2, RS3, RS4 and RS5, without changing the special kinematic of the transmission. In particular this can be appropriate if in the transmission GE, the transmission input shaft AN and the transmission output shaft AB are not arranged coaxially with one another, as is the case for example in a so-termed front-transverse configuration in the vehicle.

Starting from the recognition that it is in principle possible to replace a so-termed minus planetary gearset with a kinematically equivalent plus planetary gearset, provided that the coupling of the sun gear, the planetary carrier and the ring gear of the planetary gearset to the other planetary gearsets and the shifting elements and, where necessary, to the housing is spatially possible, a person with knowledge of the field will if necessary be able to replace one or more of the minus planetary gearsets shown in the figure by one or more plus planetary gearsets. As is known, in a minus planetary gearset each of its planetary gearwheels meshes with both the sun gear and the ring gear, whereas in a plus planetary gearset each of its inner planetary gearwheels meshes with one of its outer planetary gearwheels and with the sun gear while each of its outer planetary gearwheels meshes with one of its inner planetary gearwheels and with the ring gear.

To retain the kinematic of the gearset system defined in FIG. 2, it is only necessary for the first element of each minus planetary gearset to be in the form of a sun gear, the second element of each minus planetary gearset to be a planetary carrier and the third element of each minus planetary gearset to be a ring gear, whereas the first element of each plus planetary gearset has to be a sun gear, the second element of each plus planetary gearset a ring gear and the third element of each plus planetary gearset a planetary carrier. All the variants generated in such manner can be operated with the shifting scheme shown in FIG. 3.

Figure 4:
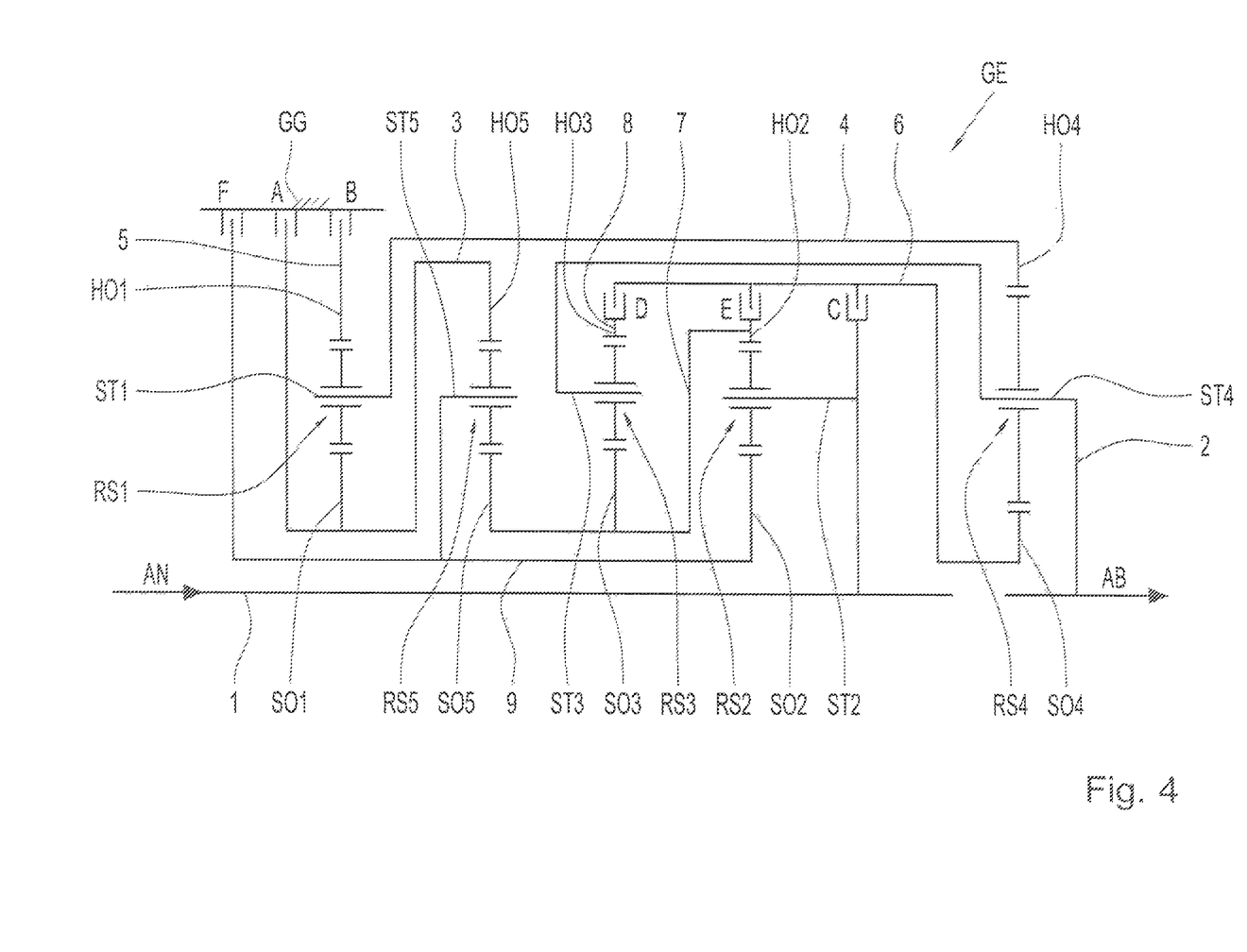
FIG. 4: A schematic representation of a second example embodiment of an automatic transmission according to the invention.

FIG. 4 shows a gearset layout of a second example embodiment of an automatic transmission according to the invention. Again, the transmission GE designed as an automatic transmission has a transmission input shaft AN, a transmission output shaft AB, five planetary gearsets RS1, RS2, RS3, RS4 and RS5 and six shifting elements A, B, C, D, E, and F, all accommodated in a transmission housing GG of the transmission GE. In total the transmission GE has nine rotating shafts denoted in FIG. 4 by the numerals 1 to 9, wherein the first rotating shaft 1 serves as the transmission input shaft AN while the second rotating shaft 2 serves as the transmission output shaft AB. The five planetary gearsets RS1, RS2, RS3, RS4, RS5 are arranged coaxially with one another and one after another in the axial direction, this time in the defined sequence "RS1-RS5-RS3-RS2-RS4". In this case, for example, the first planetary gearset RS1 faces toward the drive input of the transmission GE whereas the fourth planetary gearset RS4 is arranged on the drive output side of the transmission GE. Again, the transmission GE has a total of nine rotating shafts denoted in FIG. 4 by the numerals 1 to 9, and the first rotating shaft 1 serves as the transmission input shaft AN while the second rotating shaft 2 serves as the transmission output shaft AB.

The transmission GE can for example be driven by an internal combustion engine, whose rotating crankshaft is functionally connected, for example by way of a suitable starling element, to the transmission input shaft AN of the transmission GE. For simplicity, however, the drive input of the transmission GE is not shown in FIG. 4.

To the benefit of efficiency, each of the five planetary gearsets RS1, RS2, RS3, RS4, RS5 is designed as a so-termed minus planetary gearset comprising three elements. The first element is in each case a sun gear and is indexed in FIG. 4 as SO1, SO2, SO3, SO4 and SO5, whereas the second element is in each case a planetary carrier indexed ST1, ST2, ST3, ST4 and ST5 in FIG. 4. Correspondingly, the third element is in each case a ring gear and is indexed HO1, HO2, HO3, HO4 and HO5 in FIG. 4.

With regard to the coupling of the planetary gearset elements, in this case the following provisions are made: The planetary carrier ST2 of the second planetary gearset RS2 forms the first rotating shaft 1 of the transmission GE and thus the transmission input shaft AN. The planetary carrier ST3 of the third planetary gearset RS3 and the planetary carrier ST4 of the fourth planetary gearset RS4 are permanently connected to one another and together form the second rotating shaft 2 of the transmission GE and thus the transmission output shaft AB. The sun gear SO1 of the first planetary gearset RS1 and the ring gear HO5 of the fifth planetary gearset RS5 are permanently connected to one another and together form the third rotating shaft 3 of the transmission GE. The planetary carrier ST1 of the first planetary gearset RS1 and the ring gear HO4 of the fourth planetary gearset RS4 are permanently connected to one another and together form the fourth rotating shaft 4 of the transmission GE. The ring gear HO1 of the first planetary gearset RS1 forms the fifth rotating shaft 5 of the transmission GE. The sun gear SO4 of the fourth planetary gearset RS4 forms the sixth rotating shaft 6 of the transmission GE. The sun gear SO5 of the fifth planetary gearset RS5, the ring gear HO2 of the second planetary gearset RS2 and the sun gear SO3 of the third planetary gearset RS3 are permanently connected to one another and together form the seventh rotating shaft 7 of the transmission GE. The ring gear HO3 of the third planetary gearset RS3 forms the eighth rotating shaft 8 of the transmission GE. The planetary carrier ST5 of the fifth planetary gearset RS5 and the sun gear SO2 of the second planetary gearset RS2 are permanently connected to one another and together form the ninth rotating shaft 9 of the transmission GE.

With regard to the arrangement of the shifting elements in the power flow of the transmission GE, the following provisions are made: The first shifting element A is in the form of a brake and is arranged in the power flow between the third rotating shaft 3 and the transmission housing GG, so that when the first shifting element A is closed, the sun gear SO1 of the first planetary gearset RS1 and the ring gear HO5 of the fifth planetary gearset RS5 together are immobilized relative to the transmission housing GG. The second shifting element B is a brake and is arranged in the power flow between the fifth rotating shaft 5 and the transmission housing GG, so that when the second shaft B is closed the ring gear HO1 of the first planetary gearset RS1 is immobilized relative to the transmission housing GG. The third shifting element C is in the form of a clutch and is arranged in the power flow between the first and sixth rotating shafts 1, 6, so that when the third shifting element C is closed, the ring gear HO3 of the third planetary gearset RS3 and the sun gear SO4 of the fourth planetary gearset RS4 together are connected to the planetary carrier ST2 of the second planetary gearset RS2—i.e. to the transmission input shaft AN. The fourth shifting element D is a clutch and is arranged in the power flow between the sixth and eighth rotating shafts 6, 8, so that when the fourth shifting element D is closed, the sun gear SO4 of the fourth planetary gearset RS4 is connected to the ring gear HO3 of the third planetary gearset RS3. The fifth shifting element E is in the form of a clutch and is arranged in the power flow between the sixth and seventh rotating shafts 6, 7, so that when the fifth shifting element E is closed, the sun Gear SO4 of the fourth planetary gearset RS4 is connected to the ring gear HO2 of the second planetary gearset RS2, to the sun gear SO3 of the third planetary gearset RS3 and to the sun gear SO5 of the fifth planetary gearset RS5. The sixth shifting element F is a brake and is arranged in the power flow between the ninth rotating shaft 9 and the transmission housing GG, so that when the sixth shifting element F is closed, the sun gear SO2 of the second planetary gearset RS2 and the planetary carrier ST5 of the fifth planetary gearset RS5 together are immobilized relative to the transmission housing GG.

The transmission GE can be shifted by means of its six shifting elements A, B, C, D, E and F which, as an example, are in FIG. 4 all in the form of frictional shifting elements with disks as their frictional components. In this case, for the second example embodiment of an automatic transmission according to the invention shown in FIG. 4 the same shifting logic can be used as for the first example embodiment of an automatic transmission according to the invention shown in FIG. 2, i.e. the shifting logic already explained in detail earlier with reference to FIG. 3. Thus, the transmission GE shown in FIG. 4 also enables up to ten forward gears and up to two reverse gears to be engaged without group shifts, while by virtue of the kinematic modified by comparison with FIG. 2, the gear ratios and gear intervals may be different.

Below, more details will be given about the structural configuration of the transmission GE shown in FIG. 4. In combination with the gearset kinematic according to the invention, the spatial arrangement of the five planetary gearsets RS1, RS2, RS3, RS4, RS5 in line one after another in the sequence "RS1-RS5-RS3-RS2-RS4" makes possible a structurally very compact transmission configuration in which the first, fifth, third and second planetary gearsets RS1, RS5, RS3, RS2 are arranged directly one after another. In this case the first planetary gearset RS1 is arranged at one of the two ends—here for example the end facing toward the drive input of the transmission GE—of the transmission housing GG, whereas the fourth planetary gearset RS4 is arranged at the other end of the transmission housing GG—here corresponding to the end of the transmission housing GG facing toward the drive output of the transmission GE.

In FIG. 4 the spatial arrangement of the two immediately adjacent planetary gearsets RS1 and RS5, the two brakes A and B arranged immediately adjacent to the planetary gearset RS1 and the brake F immediately adjacent to the brake A are the same as in FIG. 2, so that there is no need to describe them in detail at this point.

As can also be seen in FIG. 4, the third planetary gearset RS3 is arranged directly next to the fifth planetary gearset RS5 on the side thereof facing away from the first planetary gearset RS1. Corresponding to the gearset kinematic, the sun gears SO5 and SO3 now arranged axially directly next to one another can be made as a common and preferably integral component in a manner favorable from the standpoint of production technology.

Viewed spatially, the clutch C is arranged in an area axially between the second and fourth planetary gearsets RS2, RS4. In this case the outer disk carrier of the clutch C is permanently connected to the sun gear SO4 of the fourth planetary gearset RS4 as a section of the sixth rotating shaft 6. Correspondingly, the inner disk carrier of the clutch C is permanently connected to planetary carrier ST2 of the second planetary gearset RS2 as a section of the first rotating shaft 1 and can be driven by the transmission input shaft AN. In a manner advantageous from the standpoint of production technology, the inner disk carrier of the clutch C and the planetary carrier ST2 can in this case be made as a common component. Expediently, the inner disk carrier of the clutch C holds both the disk pack of the clutch C and also the servo-device required for actuating the disk pack, so that a simply designed and low-leakage supply with pressure and lubricant medium for the hydraulic control and coding of the rotating clutch C can take place from the transmission input shaft AN.

Viewed spatially, the disk pack of the clutch D is arranged radially above the third planetary gearset RS3 as viewed in the axial direction, in a manner that shortens the length of the transmission. In this case the inner disk carrier of the clutch D is permanently connected to the ring gear HO3 of the third planetary gearset RS3 as a section of the eighth rotating shaft 8. In a manner advantageous from the standpoint of production technology, the inner disk carrier of the clutch C and the ring gear HO3 can in this case be made as a common—preferably integral—component. The outer disk carrier of the clutch D is permanently connected to the sun gear SO4 of the fourth planetary gearset RS4 as a section of the sixth rotating shaft 6. Expediently, the outer disk carrier of the clutch D holds both the disk pack of the clutch D and also the servo-device required for actuating the disk pack, so that a simply designed and comparatively low-leakage supply with pressure and lubricating medium for the hydraulic control and cooling of the rotating clutch D, which passes through the hub of the outer disk carrier of the clutch D fitted to rotate on the transmission input shaft AN and/or the transmission output shaft AB, i.e. optionally by way of the transmission input shaft AN or the transmission output shaft AB.

Viewed spatially, the disk pack of the clutch E is arranged radially above the second planetary gearset RS2 as viewed in the axial direction, in a manner that shortens the length of the transmission. In this case, the inner disk carrier of the clutch E is permanently connected to the ring gear HO2 of the second planetary gearset RS2, to the sun gear SO3 of the third planetary gearset RS3 and to the sun gear SO5 of the fifth planetary gearset RS5 as a section of the seventh rotating shaft 7. In a manner advantageous from the standpoint of production technology, the inner disk carrier of the clutch E and the ring gear HO2 can in this case be made as a common—preferably integral—component. The outer disk carrier of the clutch E is permanently connected to the sun gear SO4 of the fourth planetary gearset RS4 as a section of the sixth rotating shaft 6. Expediently, the outer disk carrier of the clutch E holds both the disk pack of the clutch E and also the servo-device required for actuating the disk pack, so that a simply designed and comparatively low-leakage supply with pressure and lubricating medium for the hydraulic control and cooling of the rotating clutch E, passes through the hub of the outer disk carrier of the clutch E fitted to rotate on the transmission input shaft AN and/or the transmission output shaft AB, i.e. optionally by way of the transmission input shaft AN or the transmission output shaft AB.

In a manner advantageous from the standpoint of production technology, the three clutches C, D and E of the transmission GE can therefore form a clutch group that can be pre-assembled, comprising a common disk carrier that forms a section of the sixth rotating shaft 6, which is designed as the outer disk carrier for the three clutches C, D, E and holds at least the disk packs and servo-devices of the clutches D and E.

While maintaining the given transmission kinematic, the spatial arrangement of the six shifting elements A, B, C, D, E and F in the transmission housing GG can he varied within wide limits, and in this is only restricted by the dimensions and external shape of the transmission housing GG. Correspondingly, the component arrangement shown in FIG. 4 is expressly understood to be only one of numerous possible component configuration variants. Likewise, the structures of the shifting elements as disk clutches or disk brakes as shown in FIG. 4 expressly represents only an example. In alternative embodiments, for example, claw or cone clutches that engage with interlock, frictionally engaged band brakes or even claw or cone brakes that engage with interlock can also be used.

The transmission layout shown in FIG. 4 can also have a different spatial arrangement of the five planetary gearsets RS1, RS2, RS3, RS4, RS5 without changing the special kinematic of the transmission. This may in particular be appropriate if in the transmission GE the transmission input shaft AN and the transmission output shaft AB are not arranged coaxially with one another, as is the case for example in a so-termed front-transverse configuration in the vehicle.

Starting from the recognition that in principle a so-termed minus planetary gearset can be replaced by a kinematically equivalent plus planetary gearset provided that this spatially permits the coupling of the sun gear, the planetary carrier and the ring gear of the planetary gearset to the other planetary gearsets and the shifting elements, and where necessary to the housing, a person with knowledge of the field will if necessary be able to replace one or more of the minus planetary gearsets shown in FIG. 4 by one or more plus planetary gearsets. As is known, in a minus planetary gearset each of its planetary gearwheels meshes both with the sun gear and with the ring gear, whereas in a plus planetary gearset each of its inner planetary gearwheels meshes with one of its outer planetary gearwheels and with the sun gear, while each of its outer planetary gearwheels meshes with one of its inner planetary gearwheels and with the ring gear.

To maintain the kinematic of the gearset system defined in FIG. 4, it is in this case only necessary for the first element of each minus planetary gearset to be in the form of a sun gear, the second element of each minus planetary gearset to be a planetary carrier and the third element of each minus planetary gearset to be a ring gear, whereas the first element of each plus planetary gearset must be a sun gear, the second element of each plus planetary gearset a ring gear and the third element of each plus planetary gearset a planetary carrier. As already in the example embodiment shown in FIG. 4, all the variants generated in this manner can also be operated with the shifting scheme shown in FIG. 3, and by virtue of the kinematic modified by comparison with FIG. 2, other gear ratios and gear intervals can be obtained.

In other respects the transmission concept according to the invention is also very well suited for fitting into a hybrid drive-train, particularly if a rotating rotor of an electric machine provided in addition to the main drive unit is permanently connected directly to the transmission input shaft AN, or directly to the ninth rotating shaft 9, or directly to the third rotating shaft 3.

INDEXES

GE Transmission
GG Transmission housing
AB Transmission output shaft
AN Transmission input shaft
1 First rotating shaft of the transmission
2 Second rotating shaft of the transmission
3 Third rotating shaft of the transmission
4 Fourth rotating shaft of the transmission
5 Fifth rotating shaft of the transmission
6 Sixth rotating shaft of the transmission
7 Seventh rotating shaft of the transmission
8 Eighth rotating shaft of the transmission
9 Ninth rotating shaft of the transmission
A First shifting element of the transmission
B Second shifting element of the transmission
C Third shifting element of the transmission
D Fourth shifting element of the transmission
E Fifth shifting element of the transmission
F Sixth shifting element of the transmission
RS1 First planetary gearset of the transmission
SO1 Sun gear of the first planetary gearset
ST1 Planetary carrier of the first planetary gearset
PL1 Planetary gearwheels of the first planetary gearset
HO1 Ring gear of the first planetary gearset
RS2 Second planetary gearset of the transmission
SO2 Sun gear of the second planetary gearset
ST2 Planetary carrier of the second planetary gearset
PL2 Planetary gearwheels of the second planetary gearset
HO2 Ring gear of the second planetary gearset
RS3 Third planetary gearset of the transmission
SO3 Sun gear of the third planetary gearset
ST3 Planetary earner of the third planetary gearset
PL3 Planetary gearwheels of the third planetary gearset
HO3 Ring gear of the third planetary gearset
RS4 Fourth planetary gearset of the transmission
SO4 Sun gear of the fourth planetary gearset
ST4 Planetary carrier of the fourth planetary gearset
PL4 Planetary gearwheels of the fourth planetary gearset
HO4 Ring gear of the fourth planetary gearset
RS5 Fifth planetary gearset of the transmission
SO5 Sun gear of the fifth planetary gearset
ST5 Planetary carrier of the fifth planetary gearset
PL5 Planetary gearwheels of the fifth planetary gearset
HO51 Ring gear of the fifth planetary gearset

The invention claimed is:
1. An automatic transmission comprising:
a transmission housing;
a rotating transmission input shaft,
a rotating transmission output shaft;
first, second, third and fourth planetary gearsets, each of the first, the second, the third and the fourth planetary gearsets having first, second and third elements;
first, second, third, fourth and fifth shifting elements which are selectively engagable for implementing various gear ratios between the transmission input shaft and the transmission output shaft;
the second element of the second planetary gearset forms the transmission input shaft;
the second element of the fourth planetary gearset forms the transmission output shaft;
the first element of the first planetary gearset being, via the first shifting element, immovably fixable to the transmission housing;
the second element of the first planetary gearset and the third element of the fourth planetary gearset are permanently connected to one another;
the third element of the first planetary gearset being, via the second shifting element, immovably fixable to the transmission housing;
the first element of the fourth planetary gearset being connectable, via the third shifting element, to the second element of the second planetary gearset;
the third element of the second planetary gearset and the first element of the third planetary gearset are permanently connected to one another and are connectable, via the fifth shifting element, to the first element of the fourth planetary gearset;
one of the first, the second and the third elements of the fourth planetary gearset being permanently connected to one of the first, the second and the third elements of the third planetary gearset, and another one of the first, the second and the third elements of the fourth planetary gearset being connectable, via the fourth shifting element, to another one of the first, the second and the third elements of the third planetary gearset, such that the third planetary gearset is brought into a power flow of the automatic transmission by engaging the fourth shifting element;
the automatic transmission having a fifth planetary gearset with first, second and third elements;
the first element of the fifth planetary gearset being permanently connected to the third element of the second planetary gearset;
the second element of the fifth planetary gearset being permanently connected to the first element of the second planetary gearset and being immovably fixable, via a sixth shifting element, to the transmission housing; and
the third element of the fifth planetary gearset is permanently connected to the first element of the first planetary gearset.

2. The automatic transmission according to claim 1, wherein the first element of the fourth planetary gearset is permanently connected to the third element of the third planetary gearset, and the second element of the fourth planetary gearset is connectable, via the fourth shifting element, to the second element of the third planetary gearset.

3. The automatic transmission according to claim 1, wherein the second element of the fourth planetary gearset is permanently connected to the second element of the third planetary gearset, and the first element of the fourth planetary gearset is connectable, via the fourth shifting element, to the third element of the third planetary gearset.

4. The automatic transmission according to claim 1, wherein the first element of the first, the second, the third, the fourth and the fifth planetary gearsets is a sun gear;
for each of the first, the second, the third, the fourth and the fifth planetary gearsets which are designed as a minus planetary gearset, the second element is a planetary carrier, and the third element is a ring gear,
while for each of the first, the second, the third, the fourth and the fifth planetary gearsets which are designed as a plus planetary gearset, the second element is in a form of a ring gear and the third element is in a form of a planetary carrier.

5. The automatic transmission according to claim 1, wherein the first, the second, the third, the fourth and the fifth planetary gearsets are arranged coaxially with one another and one after another in an axial direction, in a sequence of: the first planetary gearset, the fifth planetary gearset, the second planetary gearset, the third planetary gearset, the fourth planetary gearset.

6. The automatic transmission according to claim 1, wherein the first, the second, the third, the fourth and the fifth planetary gearsets are arranged coaxially with one another and one after another in an axial direction, in a sequence of: the first planetary gearset, the fifth planetary gearset, the third planetary gearset, the second planetary gearset, the fourth planetary gearset.

7. The automatic transmission according to claim 1, wherein the first shifting element and the sixth shifting dement are arranged on a side of the first planetary gearset that faces away from the fifth planetary gearset.

8. The automatic transmission according to claim 7, wherein the sixth, the first and the second shifting elements are arranged axially next to one another on a same diameter, with the first shifting element positioned axially between the sixth shifting element and the second shifting element.

9. The automatic transmission according to claim 7, wherein the sixth shifting element and the first shifting element, as viewed in an axial direction, are arranged in one plane, with the sixth shifting element positioned radially below the first shifting element.

10. The automatic transmission according to claim 1, wherein for each gear, three of the first, the second, the third, the fourth, the fifth and the sixth shifting elements are engaged, and during a shift from one gear to a next-higher or a next-lower gear only one previously engaged shifting element is disengaged and only one of previously disengaged shifting elements is engaged.

11. The automatic transmission according to claim 10, wherein
in a first forward gear the second, the third and the sixth shifting elements are torque-transmitting;
in a second forward gear either the second, the fifth and the sixth shifting elements or the first, the second and the third shifting elements are torque-transmitting;
in a third forward gear the first, the second and the fifth shifting elements are torque-transmitting;
in a fourth forward gear the second, the third and the fifth shifting elements are torque-transmitting;
in a fifth forward gear the second, the fourth and the fifth shifting elements are torque-transmitting;
in a sixth forward gear the second, the third and the fourth shifting elements are torque-transmitting;
in a seventh forward gear the third, the fourth and the fifth shifting elements are torque-transmitting;
in an eighth forward gear either the first, the third and the fourth shifting elements or the third, the fourth and the sixth shifting elements are torque-transmitting,
in a ninth forward gear the first, the fourth and the fifth shifting elements are torque-transmitting;
in a tenth forward gear the fourth, the fifth and the sixth shifting elements are torque-transmitting;
in a first reverse gear the first, the second and the fourth shifting elements are torque-transmitting; and
in a second reverse gear the second, fourth and sixth shifting elements are torque-transmitting.

12. The automatic transmission according to claim 10, wherein
in a first forward gear the second, the third and the sixth shifting elements are torque-transmitting;
in a second forward gear either the second, the fifth and the sixth shifting elements or the first, the second and the third shifting elements are torque-transmitting;
in a third forward gear the first, the second and the fifth shifting elements are torque-transmitting:
in a fourth forward gear the second, the third and the fifth shifting elements are torque-transmitting;
in a fifth forward gear the second, the fourth and the fifth shifting elements are torque-transmitting;
in a sixth forward gear the second, the third and the fourth shifting elements are torque-transmitting;
in a seventh forward gear either the first, the third and the fourth shifting elements or the third, the fourth and the sixth shifting elements are torque-transmitting;
in an eighth forward gear the first, the fourth and the fifth shifting elements are torque-transmitting;
in a ninth forward gear the fourth, the fifth and the sixth shifting elements are torque-transmitting;
in a first reverse gear the first, the second and the fourth shifting elements are torque-transmitting; and
and in a second reverse gear the second, the fourth and the sixth shifting elements are torque-transmitting.

13. The automatic transmission according to claim 10, wherein
in a first forward gear either the second, the fifth and the sixth shifting elements or the first, the second and the third shifting elements are torque-transmitting;
in a second forward gear the first, the second and the fifth shifting elements are torque-transmitting;
in a third forward gear the second, the third and the fifth shifting elements are torque-transmitting;
in a fourth forward gear the second, the fourth and the fifth shifting elements are torque-transmitting;
in a fifth forward gear the second, the third and the fourth shifting elements are torque-transmitting:
in a sixth forward gear the third, the fourth and the fifth shifting elements are torque-transmitting;
in a seventh forward gear either the first, the third and the fourth shifting elements or the third, the fourth and the sixth shifting elements are torque-transmitting;
in an eighth forward gear the first, the fourth and the fifth shifting elements are torque-transmitting;
in a ninth forward gear the fourth, the fifth and the sixth shifting elements are torque-transmitting; and
in a reverse gear the second, the fourth and the sixth shifting elements or the first, the second and the fourth shifting elements are torque-transmitting.

14. The automatic transmission according to claim 10, wherein
in a first forward gear either the second, the fifth and the sixth shifting elements or the first, the second and the third shifting elements are torque-transmitting;
in a second forward gear the first, the second and the fifth shifting elements are torque-transmitting;
in a third forward gear the second, the third and the fifth shifting elements are torque-transmitting;
in a fourth forward gear the second, the fourth and the fifth shifting elements are torque-transmitting;
in a fifth forward gear the second, the third and the fourth shifting elements are torque-transmitting;
in a sixth forward gear either the first, the third and the fourth shifting elements or the third, the fourth and the sixth shifting elements are torque-transmitting;
in a seventh forward gear the first, the fourth and the fifth shifting elements are torque-transmitting;
in an eighth forward gear the fourth, the fifth and the sixth shifting elements are torque-transmitting; and in a reverse gear the second, the fourth and the sixth shifting elements or the first, the second and the fourth shifting elements are torque-transmitting.

15. The automatic transmission according to claim 1, wherein the second shifting element is designed as a transmission-internal starting element of the automatic transmission.

16. The automatic transmission according to claim 1, wherein at least one of the transmission input shaft, a further rotating shaft, an additional rotating shaft and the transmission output shaft is permanently connected to a rotating rotor of an electric machine.

17. An automatic transmission comprising:
a transmission housing, a transmission input shaft, and a transmission output shaft;
first, second, third, fourth and fifth planetary gearsets, each of the first planetary gearset, the second planetary gearset, the third planetary gearset, the fourth planetary gearset, and the fifth planetary gearset having a sun gear, a planet carrier and a ring gear;
first, second, third, fourth, fifth and sixth shifting elements, and selective engagement of the first, the second, the third, the fourth, the fifth and the sixth shifting elements implements various gear ratios between the transmission input shaft and the transmission output shaft;
the planet carrier of the second planetary gearset being permanently connected to the transmission input shaft;
the planet carrier of the fourth planetary gearset being permanently connected to the transmission output shaft;
the sun gear of the first planetary gearset being immovably connectable to the transmission housing by engagement of the first shifting element;
the planet carrier of the first planetary gearset being permanently connected to the ring gear of the fourth planetary gearset;
the ring gear of the first planetary gearset being immovably connectable to the transmission housing by engagement of the second shifting element;
the sun gear of the fourth planetary gearset being connectable to the planet carrier of the second planetary gearset by engagement of the third shifting element;
the ring gear of the second planetary gearset being permanently connected to the sun gear of the third planetary gearset and connectable to the sun gear of the fourth planetary gearset by engagement of the fifth shifting element;
the sun gear of the fifth planetary gearset being permanently connected to the ring gear of the second planetary gearset;
the planet carrier of the fifth planetary gearset being permanently connected to the sun gear of the second planetary gearset and being immovably connectable to the transmission housing by the sixth shifting element;
the ring gear of the fifth planetary gearset being permanently connected to the sun gear of the first planetary gearset; and
either:
the sun gear of the fourth planetary gearset being permanently connected to the ring gear of the third planetary gearset, and the planet carrier of the fourth planetary gearset being connectable to the planet carrier of the third planetary gearset by engagement of the fourth shift element, or
the planet carrier of the fourth planetary gearset being permanently connected to the planet carrier of the third planetary gearset, and the sun gear of the fourth planetary gearset being connectable to the ring gear of the third planetary gearset by engagement of the fourth shift element.

* * * * *